United States Patent
Bai et al.

(10) Patent No.: US 8,742,987 B2
(45) Date of Patent: Jun. 3, 2014

(54) LEAN V2X SECURITY PROCESSING STRATEGY USING KINEMATICS INFORMATION OF VEHICLES

(75) Inventors: Fan Bai, Ann Arbor, MI (US); Hariharan Krishnan, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 769 days.

(21) Appl. No.: 12/634,918

(22) Filed: Dec. 10, 2009

(65) Prior Publication Data

US 2011/0140968 A1     Jun. 16, 2011

(51) Int. Cl.
*G01S 3/02*     (2006.01)

(52) U.S. Cl.
USPC ........................................................ 342/454

(58) Field of Classification Search
USPC .................................. 342/454; 370/310, 470
See application file for complete search history.

(56) References Cited

U.S. PATENT DOCUMENTS

| | | | |
|---|---|---|---|
| 3,750,168 A * | 7/1973 | Schrader et al. | 342/30 |
| 4,379,497 A * | 4/1983 | Hainsworth et al. | 180/168 |
| 5,594,414 A * | 1/1997 | Namngani | 340/436 |
| 5,983,161 A * | 11/1999 | Lemelson et al. | 701/301 |
| 6,487,500 B2 * | 11/2002 | Lemelson et al. | 701/301 |
| 7,069,118 B2 * | 6/2006 | Coletrane et al. | 701/1 |
| 2011/0080302 A1 * | 4/2011 | Muthaiah et al. | 340/903 |

OTHER PUBLICATIONS

Hariharan Krishnan, Verify-On-Demand—Practical and Scalable Approach for Broadcast Authentication in Vehicle Safety Communication, www.ip.com, IP.com No. IPCOM000175512D, IP.com Electronic Publication: Oct. 10, 2008.

* cited by examiner

*Primary Examiner* — Harry Liu

(57) ABSTRACT

A vehicle-to-vehicle communication filtering system is provided to selectively process broadcast messages between a host vehicle and a remote vehicle. A processing unit evaluates a time-to-collision status between the host vehicle and the remote vehicle sending the message. The time-to-collision status is a function of a relative distance and a relative velocity between the host vehicle and the remote vehicle which are determined from data provided within a first portion of the message received from the remote vehicle. An attentive factor is assigned to each of the remote vehicles based on the time-to-collision with respect to each remote vehicle. The attentive factor identifies a proportion of messages broadcast from the remote vehicle to be targeted for security processing. Security processing of the message is performed based on a second portion of the message unless the attentive factor indicates the message should be ignored.

20 Claims, 5 Drawing Sheets

|   | 34 | 36 | 38 | 40 | 42 | 44 |
|---|---|---|---|---|---|---|
| ID | Distance | Velocity | T-Stamp | TTC | $\tau$ |
| B | d1 | v1 | Ts-1 | TTC-1 | $\tau-1$ |
| C | d2 | v2 | Ts-2 | TTC-2 | $\tau-2$ |
| D | d3 | v3 | Ts-3 | TTC-3 | $\tau-3$ |

Vehicle A — 30

| ID | Distance | Velocity | T-Stamp | TTC | $\tau$ |
|---|---|---|---|---|---|
| A | d4 | v4 | Ts-4 | TTC-4 | $\tau-4$ |
| C | d5 | v5 | Ts-5 | TTC-5 | $\tau-5$ |
| D | d6 | v6 | Ts-6 | TTC-6 | $\tau-6$ |

Vehicle B — 31

| ID | Distance | Velocity | T-Stamp | TTC | $\tau$ |
|---|---|---|---|---|---|
| A | d7 | v7 | Ts-7 | TTC-7 | $\tau-7$ |
| B | d8 | v8 | Ts-8 | TTC-8 | $\tau-8$ |
| D | d9 | v9 | Ts-9 | TTC-9 | $\tau-9$ |

Vehicle C — 32

| ID | Distance | Velocity | T-Stamp | TTC | $\tau$ |
|---|---|---|---|---|---|
| A | d10 | v10 | Ts-10 | TTC-10 | $\tau-10$ |
| B | d11 | v11 | Ts-11 | TTC-11 | $\tau-11$ |
| C | d12 | v12 | Ts-12 | TTC-12 | $\tau-12$ |

Vehicle D — 33

Fig. 4

LEAN V2X SECURITY PROCESSING STRATEGY USING KINEMATICS INFORMATION OF VEHICLES

BACKGROUND OF INVENTION

An embodiment of the invention relates generally to vehicle-to-vehicle communication.

Single hop geocast protocols provide for the periodic broadcasting of vehicle driving awareness conditions such as slow moving vehicles (SVA) and post crash notification (PCN). Vehicles disseminate messages conditions containing safety warning information to other vehicles within a broadcasting range for notification of the various driving conditions. The objective of message dissemination is to reduce accidents by forewarning vehicle drivers of such conditions. When a vehicle receives a notification message, the message is conventionally placed into a queue and processed in an order it is received. Security processing verification is the authentication of a digital message. A valid digital signature provides assurance to the entity receiving the message that the message was created by a known sender. It also demonstrates that the message was not altered during transmission. Processing a digital signature is computationally intensive and time consuming.

The drawback with the above described system is the flooding of messages within a receiver of the vehicle which causes an overloading of messages waiting for security verification to be completed before further being processed by the host vehicle. As a result, security verification requires expensive and computational intensive processors to accommodate the processing of every message received from the remote vehicles within a broadcasting range of the host vehicle.

SUMMARY OF INVENTION

An advantage of an embodiment is the reduced load on the processors by a vehicle within a vehicle-to-vehicle communication system which provides for the use of less expensive and low computational processors.

An embodiment contemplates a method of selectively verifying and processing messages within a vehicle-to-vehicle communication system. A host vehicle receives a message in the vehicle-to-vehicle communication system from a remote vehicle. A time-to-collision status is evaluated between the host vehicle and the remote vehicle sending the message. The time-to-collision status being a function of a relative distance and a relative velocity between the host vehicle and the remote vehicle which are determined from data provided within a first portion of the message received from the respective remote vehicle. An attentive factor is assigned to the remote vehicle based on the time-to-collision status. The attentive factor for a remote vehicle identifies a proportion of messages broadcast from the remote vehicle to be targeted for security processing. Security processing is performed on the message using a second portion of the message unless the attentive factor indicates the message should be ignored. Subsequent messages are processed for evaluating the time-to-collision status and attentive factor.

An embodiment contemplates a vehicle-to-vehicle communication filtering system for selectively processing broadcast messages between a host vehicle and a remote vehicle. The system includes a processing unit for processing messages broadcast from a remote vehicle. A communication device is provided for wirelessly broadcasting and receiving wireless messages. A Global Positioning System (GPS) device, or similar, identifies a global position of the host vehicle. The processing unit evaluates a time-to-collision status between the host vehicle and the remote vehicle sending the message. The time-to-collision status is a function of a relative distance and a relative velocity between the host vehicle and the remote vehicle which are determined from data provided within a first portion of the message received from the remote vehicle. An attentive factor is assigned to each of the remote vehicles based on the time-to-collision with respect to each remote vehicle. The attentive factor identifies a proportion of messages broadcast from the remote vehicle to be targeted for security processing. Security processing of the message is performed based on a second portion of the message unless the attentive factor indicates the message should be ignored.

BRIEF DESCRIPTION OF DRAWINGS

FIG. 4 illustrates data tables stored in a memory of each of the vehicles.

DETAILED DESCRIPTION

Figure 1:
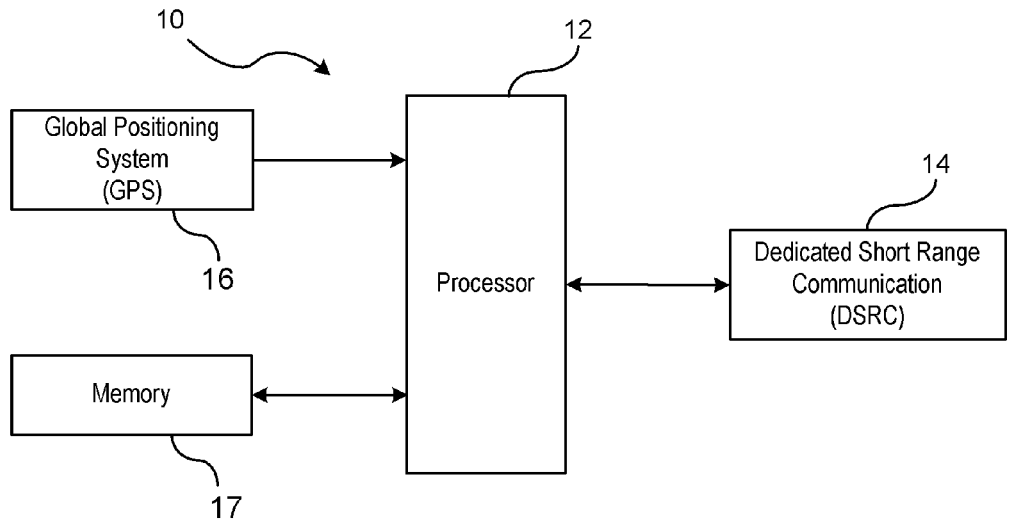
FIG. 1 is a block diagram of a vehicle hardware communication system for a vehicle-to-vehicle communication system.

There is shown in FIG. 1 a vehicle-to-vehicle communication system 10. The vehicle-to-vehicle communication system 10 includes a processor 12 for processing incoming and outgoing messages between a host vehicle and remote vehicles. A dedicated short range communications radio (DSRC) 14 is provided for transmitting and receiving messages to and from remote vehicles that are within a broadcasting range of the host vehicle. The vehicle-to-vehicle communication system 10 further includes a global positioning system (GPS) device 16, or similar, for identifying a global position of the host vehicle. The global position of the host vehicle is compared to the global position of the remote vehicles for determining a spatial relationship or relative distance between the host vehicle and the remote vehicle. A memory 17 is also provided for storing data obtained from the received message. The memory 17 may be a standalone memory, a memory of the processor, or an existing memory device.

Figure 2:
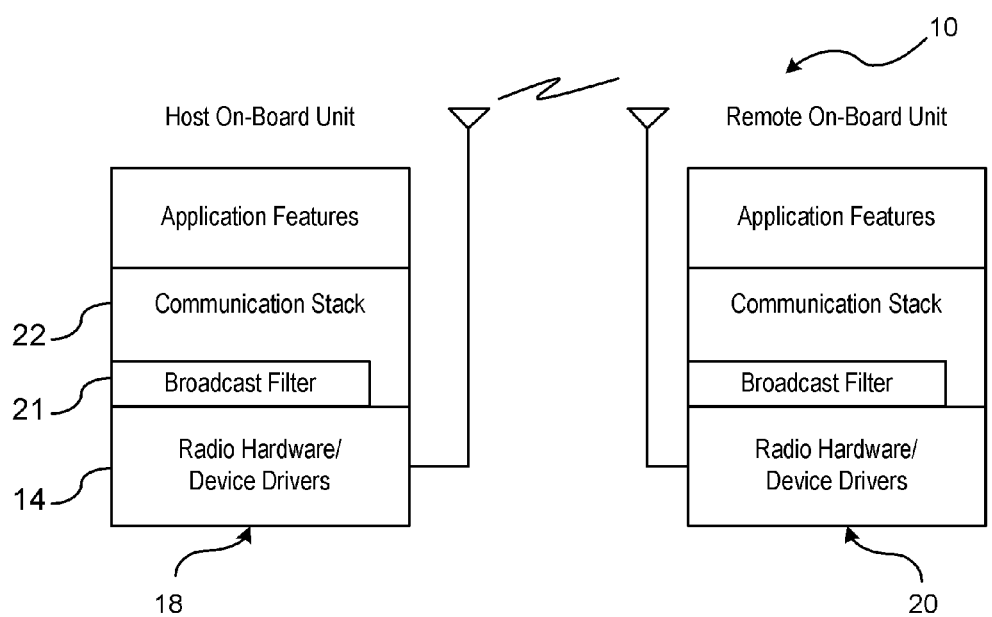
FIG. 2 is a block diagram of a vehicle-to-vehicle communication system for a host vehicle and a remote vehicle.

FIG. 2 illustrates a block diagram of a vehicle-to-vehicle communication system for processing broadcast messages between a host vehicle and a remote vehicle. The vehicle communication system 10 includes communication devices, such as an on-board unit (OBU), for broadcasting message between vehicles. A host vehicle OBU 18 is shown communicating with a remote vehicle OBU 20.

The messages are broadcast between the host vehicle OBU 18 and the remote vehicle OBU 20 via their respective antennas. Messages are received from any one of the plurality of remote vehicles within a broadcast range of the host vehicle. The system uses a dedicated short range communication protocol (DSRC), or like system, as the communication protocol. The advantage of using the DSRC protocol and the SAE J2735 Basic Safety Message (BSM) is that given the received message may contain the exact location of the problem (e.g., accident), the DSRC provides a means for the vehicle receiving the message to know its own exact location and correlate this with the data of the message to determine if the problem is relevant to the vehicle receiving the message.

Each OBU includes radio hardware and device drivers for wireless communication such as the DSRC radio 14. A communication stack 21 is a stack of protocols layered upon one another. Each protocol typically communicates with two other protocol layers.

In one embodiment of the invention, each OBU includes a broadcast filter 22. The broadcast filter 22 is a low-level protocol which determines whether the message should be ignored or accepted for further processing. Each message that is received by a remote vehicle is initially processed to obtain preliminary information (a first portion of the message) required to determine whether the message should be ignored or whether processing of a second portion of the message employing security verification is required. It should be understood that the terms first portion and second portion relates to different segments in the signal from which the data is obtained and is not meant to be conditional to the order in which the data is disposed in the signal. Such preliminary information obtained includes a vehicle identification of the remote vehicle, timestamp of the message, GPS location (e.g., latitude and longitude), and velocity (e.g., speed and heading) of the remote vehicle. This preliminary information is used to determine a relative velocity and relative distance between the host vehicle and the remote vehicle. The determination of the relative velocity and relative distance requires low-level computation, and therefore, inexpensive and low-computational capability processors may be used to determine the above criteria. Since security verification and other protocols are computationally intensive, the broadcast filter 22 is used as a preliminary filter to reduce the number of messages that will be fully processed by the host vehicle. Therefore, if a determination is made by the broadcast filter 22 that the message should be ignored, then no further processing is performed on the message other than to update the proximity status of the remote vehicle. The message is thereafter deleted from the queue. If a determination is made by the broadcast filter 22 that the message is targeted for additional processing, then a security verification check is performed on the message and further processing of the message is performed based on validation of the security check.

The broadcast filter 22 evaluates a time-to-collision (TTC) status between a host vehicle and remote vehicle and assigns an attentive factor ($\tau$). The attentive factor ($\tau$) identifies a proportion of messages broadcast from the remote vehicle to the host vehicle that should be targeted for security processing. The attentive factor ($\tau$) classifies the relevance of a remote vehicle according to its threat level.

The time-to-collision (TTC) is an estimated time in which an interaction would take place between the host vehicle and the remote vehicle given there respective speeds, distances and headings of the two vehicles. The interaction is described as an amount of time in which the host vehicle and the remote vehicle would be at substantially a same location (e.g., passing one another) given their current speeds and course heading. The time-to-collision (TTC) between the host vehicle and the remote vehicle is determined based on global position data and vehicle speed data provided in the first portion of the message. The time-to-collision (TTC) is represented by the following equation:

$$TTC = -\frac{Dist(A, B)}{|RV(A, B)|} \quad (1)$$

where Dist(A, B) is the determined distance between the host vehicle and the remote vehicle and |RV (A, B)| is the relative velocity between host vehicle and the remote vehicle.

The attentive factor ($\tau$) assigned to that remote vehicle is a function of the time-to-collision (TTC) between the remote vehicle and the host vehicle. The attentive factor ($\tau$) identifies a time interval in which broadcast messages are disregarded prior to a message being processed. Alternatively, the attentive factor ($\tau$) can be converted to an integer that identifies which message out of the predetermined number of consecutive broadcast messages is targeted for processing. The attentive factor ($\tau$) is represented by the following equation:

$$\tau = \begin{Bmatrix} \tau_{safety}, & TTC \leq \alpha \\ \min\left(\left\lceil \frac{TTC}{\alpha} \right\rceil, \beta\right) * \tau_{safety}, & TTC > \alpha \end{Bmatrix} \quad (2)$$

where $\alpha$ is a predetermined constant relating to an average driver's reaction time, $\tau_{safety}$ is a predetermined time interval, and TTC is the time-to-collision, and $\beta$ represents a constant that is predetermined by calibration testing to achieve best performance. The driver reaction time may be represented as a typical response time for the driver to initiate a change in a vehicle operation to avoid a collision or other driving condition. When determining the attentive factor, the time-to-collision (TTC) is compared to the driver reaction time $\alpha$. If the time-to-collision (TTC) is less than the driver reaction time $\alpha$, then a default value of $\tau_{safety}$ is utilized. If the time-to-collision (TTC) is greater than the driver reaction time $\alpha$, then the minimum of the two alternatives (i.e., $$\left\lceil \frac{TTC}{\alpha} \right\rceil$$

or $\beta$) multiplied by the default value $\tau_{safety}$ is used.

Figure 3:
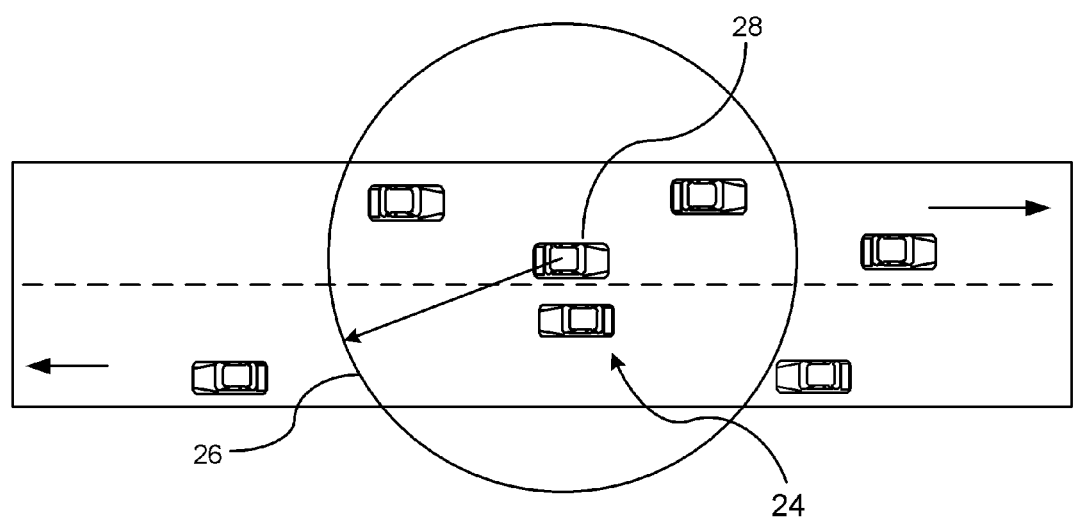
FIG. 3 is a graphic illustration of remote vehicles within a broadcasting range of a host vehicle.

Since a plurality of remote vehicles may be within a broadcast range of the host vehicle at any given time, a respective time-to-collision (TTC) and an associated attentive factor ($\tau$) are determined for each remote vehicle in broadcast range of the host vehicle. FIG. 3 illustrates a plurality of remote vehicles 24 within a broadcast range 26 of the host vehicle 28. The plurality of vehicles 24 may be traveling in a same direction as the host vehicle 26 or in an opposite direction. To reduce a computation load on the processor, only a first portion of each of the received messages from the plurality of remote vehicles 24 are processed for determining a respective time-to-collision (TTC) and an associated attentive factor ($\tau$) for each remote vehicle. The recorded data for each remote vehicle may be stored in memory using data tables illustrated in FIG. 4. The recorded data may include the vehicle identification, the relative distance, the relative velocity, the timestamp, the determined time-to-collision between the host vehicle and the remote vehicle, and an attentive factor for each vehicle.

Tables 30-33, illustrated in FIG. 4, each represent a respective vehicle identifying itself as the host vehicle. Each vehicle views itself as a host vehicle and the other vehicles in broadcast range of itself as remote vehicles. Each of the vehicles listed in each table represents remote vehicles exchanging communication messages with the host vehicle. For example, table 30 represents recorded data for vehicle A. Vehicle A maintains itself as a host vehicle whereas vehicles B, C, and D are viewed as remote vehicles by vehicle A in table 30. Each of the vehicles is identified by a vehicle identification 34. For illustrative purposes, the vehicle identifications are listed as A-D; however, it is understood that any type of code or other identification may be used by the vehicle for maintaining a distinction between the remote vehicles. Typically, remote vehicles transmit a vehicle identification as part of the broadcast message identifying itself, which may be used in the table. The recorded data further includes a relative distance 36, a relative velocity 38, and a timestamp 40 that is determined from the data retrieved in the broadcast message. A time-to-collision (TTC) 42 and an attentive factor ($\tau$) 44 are derived from relative velocity 36 and the relative distance 38.

Each of the remaining tables 31-33 illustrated in FIG. 4 represents respective vehicles (B-D) as host vehicles. As is shown in FIG. 4, each vehicle maintains a dynamic evaluation of a proximity to each surrounding vehicle and determines an attentive factor which is used to selectively filter received messages that are received by a vehicle. The attentive factor is dynamically updated each time a message is received by a vehicle; however, only those messages that have been targeted for processing based on the determined attentive factor will be further processed for security verification.

The recorded data in a respective table is exclusive to a host vehicle and a respective remote vehicle. As a result, each vehicle in broadcast communication with one another will record and maintain data in its memory for assessing a proximity to one another.

Figure 5:
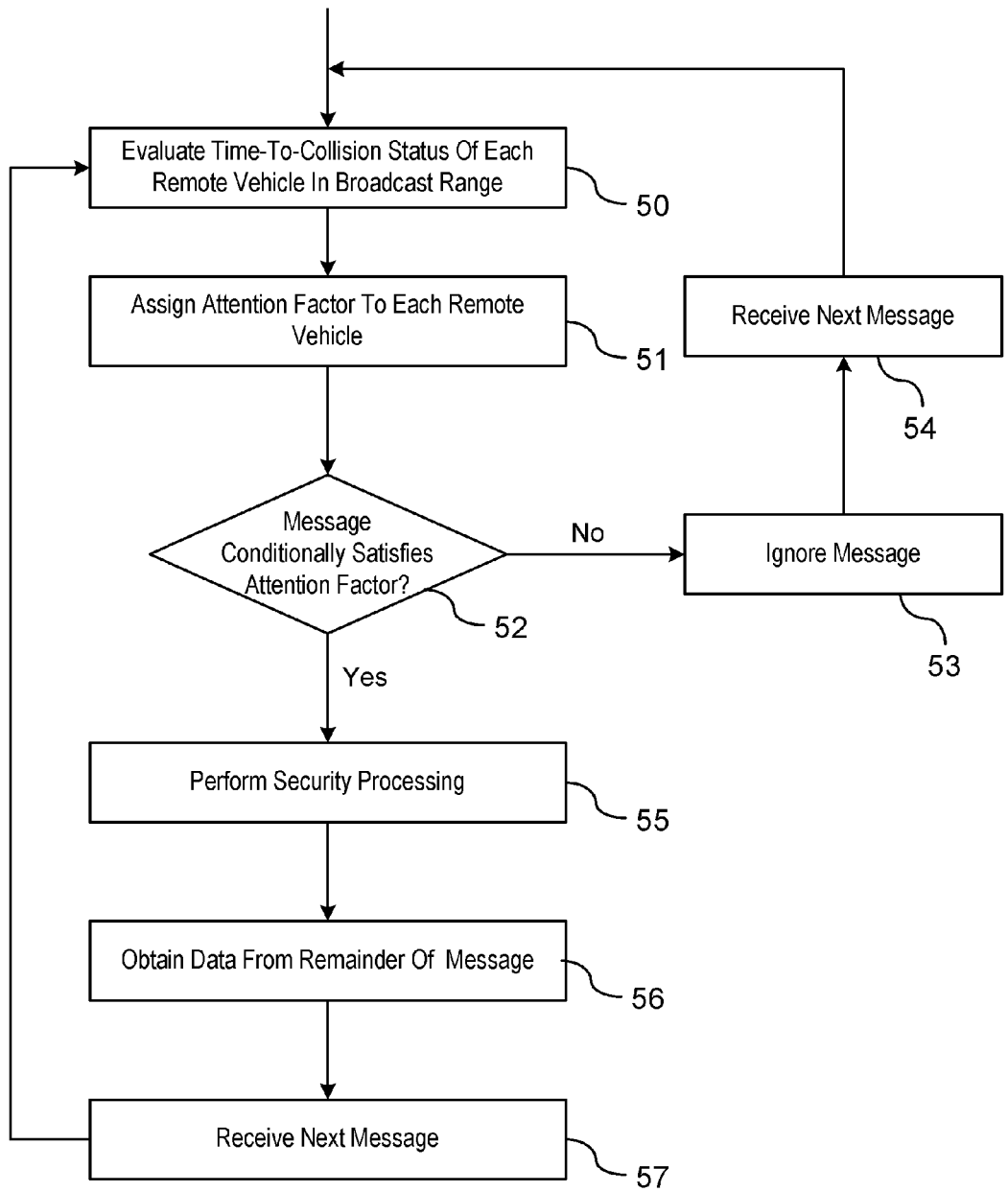
FIG. 5 is a flow chart of a high level process flow of the message filtering system.

FIG. 5 illustrates a high level process flow diagram of the selective filtering of messages for a host vehicle. In step 50, the time-to-collision (TTC) status of each remote vehicle in a broadcast range of the host vehicle is evaluated. In step 51, an attentive factor is assigned to each remote vehicle based on the time-to-collision (TTC).

In step 52, a determination is made whether the received message satisfies the attentive factor. If the message does not satisfy the attentive factor, then the routine proceeds to step 53 and the message is ignored. The routine proceeds to the step 54 where a next message is received to evaluate the time-to-collision (TTC).

In step 52, if the determination is made that the received message satisfies the attentive factor, the routine proceeds to step 55 wherein security processing is performed.

In step 56, data is obtained from a remainder of the message.

In step 57, a next message is received for evaluating the time-to-collision (TTC).

Figure 6:
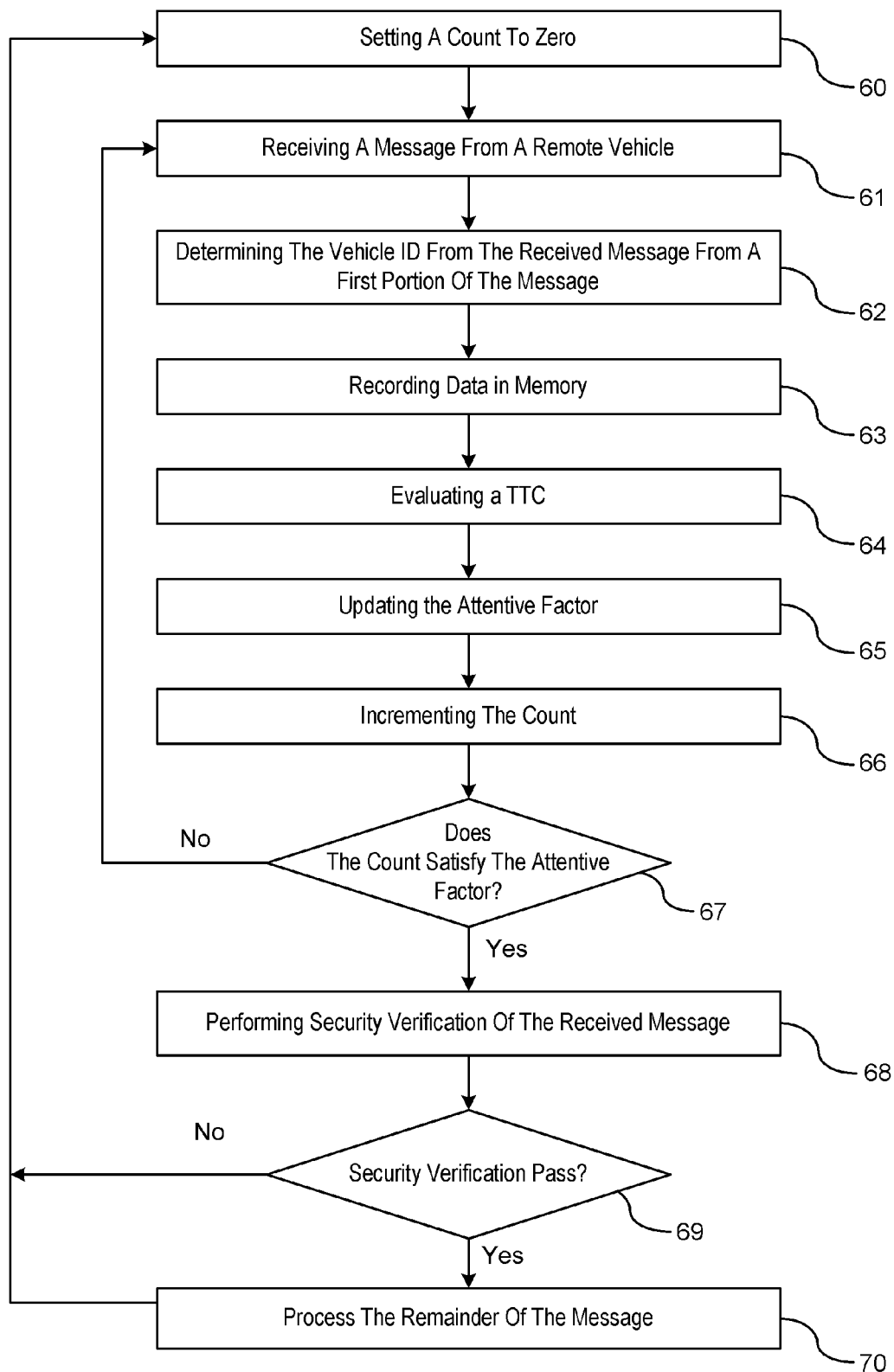
FIG. 6 is a is a flow chart of a detailed process flow of the message filtering system

FIG. 6 illustrates a detailed process flow diagram of the selective filtering of received broadcast messages from remote vehicles.

In step 60, a counter is set to zero. In step 61, a message is received by a remote vehicle.

In step 62, a first portion of the message is processed to determine the vehicle identification.

After the remote vehicle is identified, other data for determining a relative velocity and relative distance between the host vehicle and the identified remote vehicle is recorded in memory in step 63. The data is segregated and maintained in memory so that the dynamic spatial relationship to each remote vehicle is constantly monitored.

In step 64, a time-to-collision (TTC) is evaluated using the formula shown in eq. (1).

In step 65, an attentive factor ($\tau$) is updated as a function of the on time-to-collision (TTC) as shown in eq. (1). The attentive factor ($\tau$) identifies a time interval in which messages received during that time interval should be ignored. At the end of the time interval, a respective message is targeted for further processing. It should be understood that in this embodiment the time interval is converted to a count number based on a constant flow of messages being received. Therefore, a respective number of messages received consecutively by a remote vehicle relates to a respective interval of time.

In step 66, the count is incremented by 1.

In step 67, a determination is made whether the count satisfies the attentive factor ($\tau$). For example, the attentive factor may identify that every 1 out of $n^{th}$ messages from the remote vehicle are targeted for processing. If the determination is made that the count does not satisfy the attentive factor, then the message is ignored and a return is made to step 61 to receive a next message.

In step 67, if the determination is made that the count does satisfy the attentive factor, then the routine proceeds to step 68 for performing a security verification of the received message.

In step 68, the digital signature of the message is checked for authentication.

In step 69, a determination is made whether the security verification is passed. If the security verification fails, then a return is made to step 60 to reset the count. The message may be ignored or may follow a protocol that is provided for failed security verification.

In step 69, if the determination is made that the security verification passes, then the routine proceeds to step 70 where the second portion of the message is processed to evaluate the entire content of the message. The routine proceeds to step 60 to reset the count and receive a next message.

It should be understood that the embodiment described herein using a count is only one example of how the invention is carried out and that various other embodiments may be used to determine the time interval without deviating from the scope of the invention.

While certain embodiments of the present invention have been described in detail, those familiar with the art to which this invention relates will recognize various alternative designs and embodiments for practicing the invention as defined by the following claims.

What is claimed is:

1. A method of selectively verifying and processing messages within a vehicle-to-vehicle communication system, the method comprising the steps of:
   (a) a host vehicle receiving a message in the vehicle-to-vehicle communication system from a remote vehicle;
   (b) evaluating a time-to-collision status between the host vehicle and the remote vehicle sending the message, the time-to-collision status being a function of a relative distance and a relative velocity between the host vehicle and the remote vehicle which are determined from data provided within a first portion of the message received from the respective remote vehicle;
   (c) assigning an attentive factor to the remote vehicle based on the time-to-collision status, the attentive factor for a remote vehicle identifying a non-zero proportion of messages broadcast from the remote vehicle to be targeted for security processing, the proportion of messages being less than 100 percent;
   (d) performing security processing of the message using a second portion of the message unless the attentive factor indicates the message should be ignored; and
   (e) returning to step (a) for each subsequent message.

2. The method of claim 1 wherein the host vehicle maintains recorded data in a memory, the recorded data obtained from the first portion of the broadcast messages for determining the attentive factor of each remote vehicle.

3. The method of claim 2 wherein the recorded data includes a vehicle identification for identifying each remote vehicle in communication with the host vehicle, a determined distance between the host vehicle and each remote vehicle, and a relative velocity between the host vehicle and each remote vehicle.

4. The method of claim 3 wherein the recorded data is stored in a data table.

5. The method of claim 3 wherein the recorded data for a respective remote vehicle is updated when a message from the respective remote vehicle is received and processed.

6. The method of claim 1 wherein the time-to-collision is determined by the following formula:

$$TTC = -\frac{Dist(A, B)}{|RV(A, B)|}$$

where Dist(A,B) is the determined distance between the host vehicle and the remote vehicle and |RV(A,B)| is the relative velocity between host vehicle and the remote vehicle.

7. The method of claim 2 wherein the attentive factor is determined by the following formula:

$$\tau = \left\{ \begin{array}{ll} \tau_{safety}, & TTC \leq \alpha \\ \min\left(\left\lfloor \frac{TTC}{\alpha} \right\rfloor, \beta\right) * \tau_{safety}, & TTC > \alpha \end{array} \right\}$$

where $\alpha$ is a predetermined constant relating to an average driver's reaction time, $\tau_{safety}$ is a predetermined time interval, and TTC is the time-to-collide.

8. The method of claim 7 wherein the attentive factor identifies a time interval of broadcast messages that are disregarded prior to a respective broadcast message being processed.

9. The method of claim 7 wherein the attentive factor identifies a respective message out of predetermined number of consecutive broadcast messages that is to be processed by the host vehicle.

10. The method of claim 7 wherein processing the respective broadcast message includes conducting a security verification on the respective broadcast message for determining authenticity of the received broadcast message.

11. The message of claim 7 wherein the message is processed for determining a threat of the remote vehicle in relation to the host vehicle.

12. The message of claim 7 wherein $\tau_{safety}$ is approximately 100 msec.

13. A vehicle-to-vehicle communication filtering system for selectively processing broadcast messages between a host vehicle and a remote vehicle, the system comprising:
   a processing unit for processing messages broadcast from a remote vehicle;
   a communication device for wirelessly broadcasting and receiving wireless messages;
   a GPS device for identifying a global position of the host vehicle;
   wherein the processing unit evaluates a time-to-collision status between the host vehicle and the remote vehicle sending the message, the time-to-collision status being a function of a relative distance and a relative velocity between the host vehicle and the remote vehicle which are determined from data provided within a first portion of the message received from the remote vehicle, wherein an attentive factor is assigned to each of the remote vehicles based on the time-to-collision with respect to each remote vehicle, the attentive factor for a remote vehicle identifying a non-zero proportion of messages broadcast from the remote vehicle to be targeted for security processing, the proportion of messages being less than 100 percent, wherein security processing of the message is performed based on a second portion of the message unless the attentive factor indicates the message should be ignored.

14. The system of claim 13 further comprising a memory for maintaining recorded data for determining the attentive factor of each remote vehicle.

15. The system of claim 14 further wherein the recorded data is stored as a data table.

16. The system of claim 13 wherein the communication device is a dedicated short range communication radio.

17. The system of claim 13 wherein the time-to-collision is characterized by the following formula:

$$TTC = -\frac{Dist(A, B)}{|RV(A, B)|}$$

where Dist(A,B) is the determined distance between the host vehicle and the remote vehicle and |RV(A,B)| is the relative velocity between host vehicle and the remote vehicle.

18. The system of claim 13 wherein the attentive factor is characterized by the following formula:

$$\tau = \left\{ \begin{array}{ll} \tau_{safety}, & TTC \leq \alpha \\ \min\left(\left\lfloor \frac{TTC}{\alpha} \right\rfloor, \beta\right) * \tau_{safety}, & TTC > \alpha \end{array} \right\}$$

where $\alpha$ is a predetermined constant relating to an average driver's reaction time, $\tau_{safety}$ is a predetermined time interval, and TTC is the time-to-collide.

19. The system of claim 18 wherein the attentive factor identifies a time interval of broadcast messages that are disregarded prior to a respective broadcast message being processed.

20. The system of claim 18 wherein the attentive factor identifies a respective message out of predetermined number of consecutive broadcast messages that is to be processed by the host vehicle.

* * * * *